United States Patent [19]

Talmo

[11] 3,803,706
[45] Apr. 16, 1974

[54] METHOD OF MAKING A TRANSDUCER

[75] Inventor: Robert Eugene Talmo, Pasadena, Calif.

[73] Assignee: International Telephone and Telegraph Corporation, New York, N.Y.

[22] Filed: Dec. 27, 1972

[21] Appl. No.: 318,835

[52] U.S. Cl............ 29/610, 65/59, 156/272, 338/2
[51] Int. Cl............................................. H01c 17/00
[58] Field of Search....... 29/592, 610 SG, 584, 590, 29/585, 470, 589; 219/148; 156/275, 272, 273; 338/2, 5; 73/88.5 SD

[56] References Cited
UNITED STATES PATENTS

| | | | |
|---|---|---|---|
| 3,197,335 | 7/1965 | Leszynski | 338/2 X |
| 3,314,035 | 4/1967 | Sanchez | 338/5 X |
| 3,327,270 | 6/1967 | Garrison | 338/2 |
| 3,397,278 | 8/1968 | Pomerantz | 29/589 X |
| 3,417,459 | 12/1968 | Pomerantz | 29/589 X |
| 3,585,461 | 6/1971 | Eynon | 29/589 X |
| 3,605,258 | 9/1971 | Fisher et al. | 29/603 |
| 3,713,068 | 1/1973 | Talmo | 338/2 |

Primary Examiner—Charles W. Lanham
Assistant Examiner—Victor A. DiPalma
Attorney, Agent, or Firm—A. Donald Stolzy

[57] ABSTRACT

A method of fabricating a transducer wherein a glass layer is sputtered onto a kovar leaf spring beam. A monocrystalline silicon strain gage is then placed on the glass. The whole assembly is heated to between about 600 and 800°F, and a D.C. source of potential with positive and negative poles connected to the strain gage and glass layer, respectively, supplies current while the assembly is maintained with the aforementioned temperature range. The source has an output of between about 150 and 1,000 volts. The sputtering step speeds the process and saves considerable effort and expense in prior art lapping and bonding thin glass sheets to the beam.

4 Claims, 5 Drawing Figures

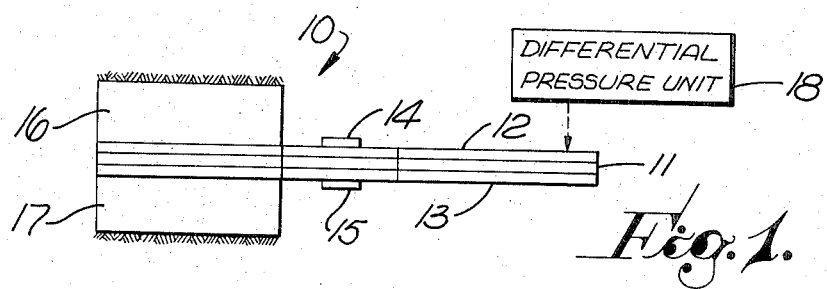
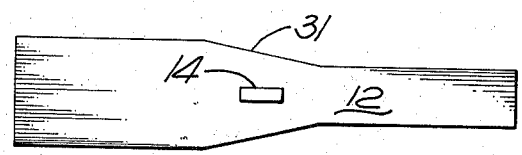
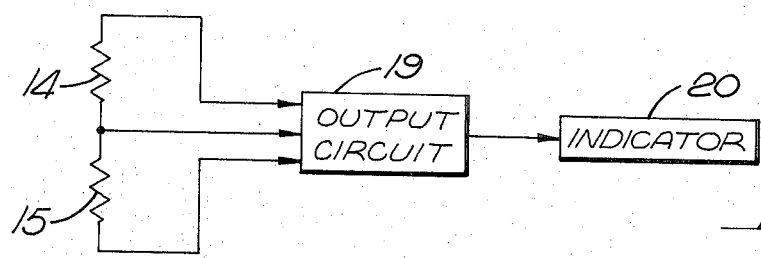
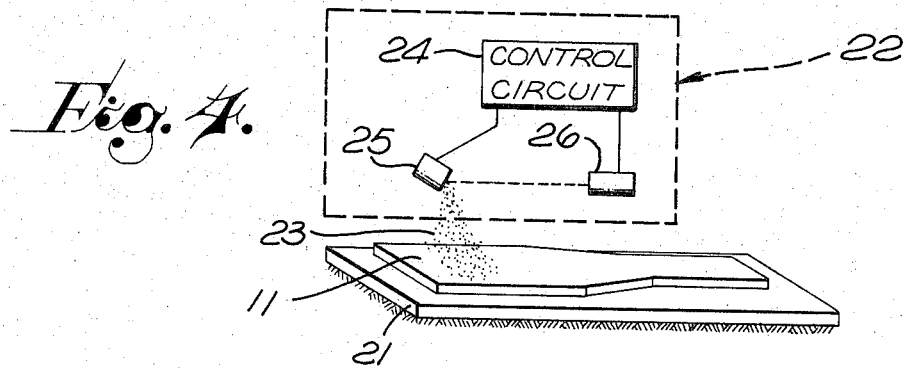
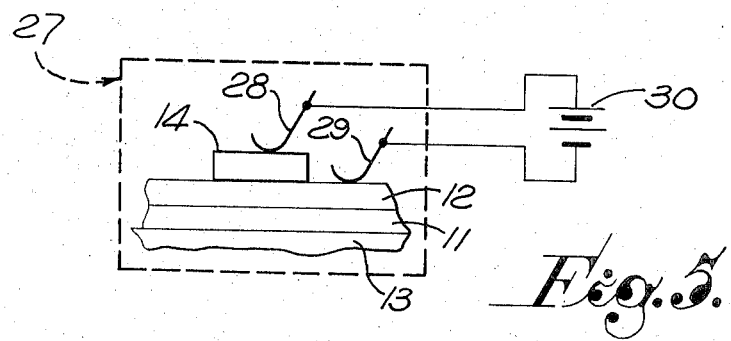

METHOD OF MAKING A TRANSDUCER

BACKGROUND OF THE INVENTION

This invention relates to the art of fabricating transducers, and more particularly, to a method of bonding a silicon strain gage to a leaf spring cantilever beam.

In the past it has been the practice to bond two strain gages to the respective opposite sides of a leaf spring cantilever beam by the use of an epoxy. One end of the beam is then fixed. The free end of the beam is then moved, for example, by a shaft fixed to one or more bellows. The shaft moves in accordance with changes in a static or differential pressure. The strain gages are connected in a Wheatstone bridge. The output of the bridge is then proportional to the pressure being detected. The output of the bridge can then be amplified and indicated or used in process control or otherwise. One of many examples of the prior art in this field is disclosed in U.S. Pat. No. 3,518,886.

A transducer made in accordance with the method of the present invention will have utility in the same field described.

The prior art method of using an epoxy bond produces transducers which cannot be used at elevated temperatures. This is true because the epoxy softens when heated and has "memory." That is, if the beam if deflected while the epoxy is soft and the temperature falls while the beam is deflected, the epoxy changes shape or "creeps" and does not return precisely to its original shape within a reasonable period of time even though its temperature is lowered to the starting temperature and the beam is no longer deflected. This memory produces an error in the transducer output.

Glass-to-metal bonds are known in the prior art. However, these bonds require delicate glass surface treatment.

Fused glass bonds are generally inoperative because when the glass is heated to its fusion temperature and then allowed to cool, the glass cracks because the thermal contraction coefficient of the metal beam is much larger than that of the glass. Molecular bonding temperatures are considerably lower than fusion bonding temperatures with substantially less chance of cracking due to stress and with stronger bonds resulting therefrom.

SUMMARY OF THE INVENTION

In accordance with the method of the present invention, the above-described and other disadvantages of the prior art are overcome by bonding a strain gage to a cantilever beam with glass.

An outstanding feature of the invention is that a glass layer is provided by directing a fine spray of molten glass particles onto the beam, e.g., by sputtering. This makes it unnecessary to treat the glass surface preparatory to bonding the strain gage thereto as required in U.S. Pat. Nos. 3,397,278 and 3,417,459.

In accordance with the present invention, the relatively hard glass bond does not "creep" as the aforesaid epoxy does. Yet it avoids the surface treatment of the last mentioned patents and does not crack during fabrication due to differential thermal contraction as in the fused glass bonds of, for example, U.S. Pat. No. 3,327,270.

The above-described and other advantages of the present invention will be better understood from the following detailed description when considered in connection with the accompanying drawings.

BRIEF DESCRIPTION OF THE DRAWINGS

In the drawings which are to be regarded as merely illutrative:

FIG. 1 is a side elevational view of a transducer constructed in accordance with the present invention;

FIG. 2 is a top plan view of a portion of the structure shown in FIG. 1;

FIG. 3 is a block diagram of the present invention;

FIG. 4 is a diagrammatic view of a step which is performed in accordance with the present invention; and FIG. 5 is a diagrammatic view illustrative of other steps performed in accordance with the present invention.

DESCRIPTION OF THE PREFERRED EMBODIMENT

In the drawings, in FIG. 1, a transducer is shown at 10 including preferably a kovar or Ni-Span-C leaf spring cantilever beam 11 having layers of glass 12 and 13 bonded to its upper and lower surfaces, respectively. Monocrystalline silicon strain gages 14 and 15 are bonded respectively to layers 12 and 13. The left end of beam 11 is fixed between members 16 and 17. The right end of beam 11 can be deflected in a direction perpendicular thereto in a plane of the drawing. Beam 11 may be deflected by, for example, a differential pressure unit 18. FIG. 2 is a top view of the beam of FIG. 1 alone illustrating a tapered constant strain region 31.

In FIG. 3, strain gages 14 and 15 are connected to an output circuit 19. An indicator 20 is connected from the output of circuit 19. Circuit 19 may be identical to that disclosed in U.S. Pat. No. 3,518,886, if desired. In such a case, the output of circuit 19 will be a current which is directly proportional to the deflection of beam 11. Indicator 20 may thus be, if desired, a milliammeter calibrated in differential pressure. Alternatively, indicator 20 may be any utilization means including, but not limited to, a process controller.

Transducer 10 is constructed by supporting beam 11 as at 21 in FIG. 4. A conventional glass sputtering equipment 22 then directs a fine spray of molten glass particles onto the upper surface of beam 11 as illustrated at 23. Beam 11 is, in succession, coated on both sides to form the layers 12 and 13 of glass.

As is conventional, equipment 22 includes control circuit 24, a glass source 25 and an electron gun 26.

Preferably, the glass employed is that sold by the Corning Glassworks under the trademark Pyrex, 7740.

After beam 11 has been coated with the glass layers 12 and 13, strain gages 14 and 15 may be bonded to the respective glass layers 12 and 13 in separate steps or simultaneously. The manner in which a strain gage is bonded to a glass layer is illustrated in FIG. 5. In FIG. 5, beam 11, and glass layers 12 and 13 are again illustrated. So is strain gage 14. Beam 11, glass layers 12 and 13 and strain gage 14 are placed in an inert gas, air or hydrogen oven 27. The temperature of oven 27 is then raised to between about 600 and 800° F. has while electrodes 28 and 29 are held in contact with strain gage 14 and glass layer 12, respectively. Normally when oven 27 is up to temperature, but not necessarily limited thereto in time, a D.C. source of potential 30 is connected between electrodes 28 and 29 with the polarity shown.

If desired, beam 11 may be made of a nickel-steel aloy about 35 to 45 percent nickel, by weight.

In FIG. 5, source 30 preferably supplies a difference of potential of between about 150 and 1,000 volts. Source 30 is preferably connected to electrodes 28 and 29 at least by the time that the parts have reached the temperature range of 600 to 800° F. When the difference of potential is applied, the current from source 30 will immediately rise to a peak value of perhaps 5 microamperes. The current will then typically decline exponentially with time to about 0.5 microamperes. It may take about 5 minutes for this decline. When the current has fallen after the peak to about 60 percent of the peak value, the bond between strain gage 14 and glass layer 12 will generally have been made so that these component parts may be cooled, and source 30 disconnected from electrodes 28 and 29. The parts may also be removed for further assembly.

Strain gage 15 may be bonded to glass layer 13 in exactly the same way that strain gage 14 is bonded to glass layer 12, if desired.

If the source 30 is connected to electrodes 28 and 29 after the parts are up to temperature, from the time source 30 is so connected, the process of obtaining a bond will usually take from about two to 20 minutes.

Glass layers 12 and 13 may have a thickness less than, equal to or greater than 0.1 or 0.2 mil, as desired.

The method of bonding strain gage 14 to glass layer 12, illustrated in FIG. 5, may be in many respects identical to the methods described in U.S. Pat. Nos. 3,397,278 and 3,417,459.

Glass layers 12 and 13 should have a thickness adequate to withstand voltage breakdown or arcing when the voltage of source 30 is applied to electrodes 28 and 29.

In the drawings, the thicknesses of the strain gages 14 and 15, and the glass layers 12 and 13 have been exaggerated for clarity.

What is claimed is:

1. The method of making a transducer, said method comprising the steps of: directing a fine spray of glass particles onto one side of a leaf spring beam to an extent and for a period such that a glass layer is formed over and bonded to at least a portion of said side; moving a silicon strain gage to a position with one flat surface in contact with said layer, said strain gage having another surface opposite said one surface; placing first and second electrodes in contact with said strain gage and said layer, respectively; heating said layer and said strain gage to a predetermined temperature; and connecting a source of potential between said electrodes while said first and second electrodes are in contact with said strain gage and said layer, respectively, and while said strain gage and said layer are maintained at said predetermined temperature.

2. The invention as defined in claim 1, wherein said glass is 7740 Pyrex glass, said beam being made of kovar, said potential being between about 150 and 1,000 volts, said predetermined temperature being between about 600 and 800° F., said source having a negative pole connected to said second electrode and a positive pole connected to said first electrode.

3. The invention as defined in claim 2, wherein said beam has a tapered constant strain region, said layer convering at least a portion of one side of said region between said beam and said strain gage.

4. The invention as defined in claim 1, wherein said beam has a tapered constant strain region, said layer covering at least a portion of one side of said region between said beam and said strain gage.

* * * * *